Patented Aug. 5, 1952

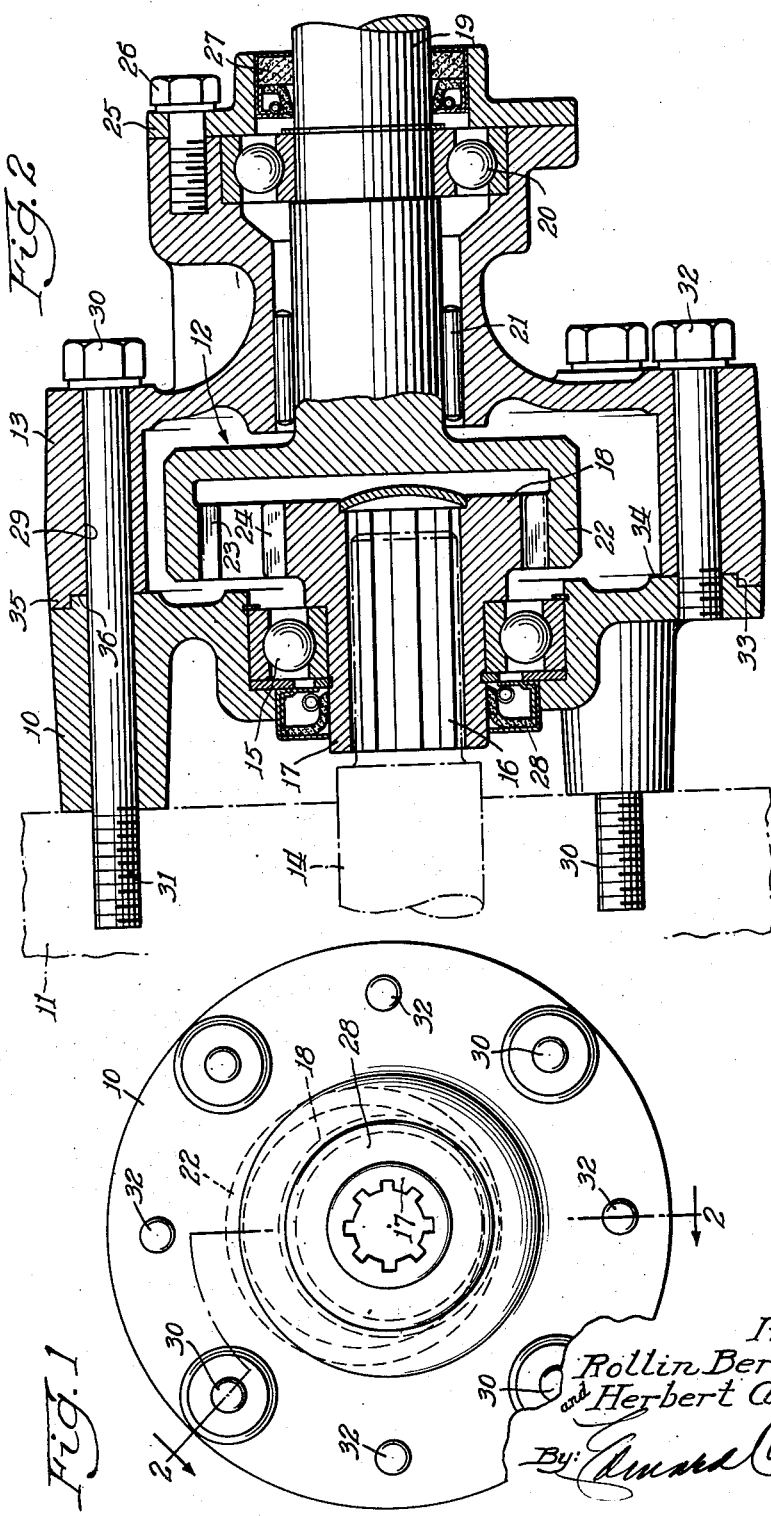

2,605,645

UNITED STATES PATENT OFFICE 2,605,645

REDUCTION GEAR UNIT

Rollin Bernard Tharpe, Garrett, and Herbert A. McAninch, Auburn, Ind., assignors to Borg-Warner Corporation, Chicago, Ill., a corporation of Illinois Application October 7, 1950, Serial No. 188,910

2 Claims. (Cl. 74—413)

The present invention pertains to power take-off devices for tractors and more particularly to a speed reducing unit for providing a drive for an implement towed by the tractor which drive is slower than the normal speed of rotation of the power take-off shaft of the tractor.

Normally the engines of tractors utilized in operating farm implements, operate at a predetermined R. P. M. such as 1500 and the power take-off unit associated with the tractor transmission is geared thereto to rotate at approximately 545 R. P. M. in order to drive the farm implements. It has been found that in cases where it is necessary for the tractor to exert more power, which occurs when the tractor is going uphill or is being used on soft ground, the engine of the tractor may operate at a speed of between 1800 R. P. M. and 2000 R. P. M. When the tractor engine operates at this speed, the speed of rotation of the take-off shaft is accordingly increased. Such an increase above the predetermined R. P. M. at which the power take-off shaft is designed to rotate, is very often detrimental to farm implements such as corn pickers, hay balers, etc., which are designed to operate at the predetermined R. P. M. of the power take-off shaft. For example, in corn pickers, if the power take-off shaft rotates too rapidly, the corn picker will tend to choke up and thereby become ineffective for its intended purpose. It is therefore the principal object of the present invention to provide a speed reducer unit for connecting the power take-off shaft of a tractor with the input shaft of a farm implement which will prevent detrimental speeds of rotation of the input shaft in the farm implement when the tractor engine is called upon to develop high speeds in order to go uphill or travel over soft ground.

The speed reducer unit forming the subject matter of the present invention has been designed to operate satisfactorily within a range of between 1500 and 2000 R. P. M. of the tractor engine, but it operates most efficiently when the speed of the tractor engine is between 1700 R. P. M. and 1800 R. P. M. which is the engine speed corresponding to the development of maximum torque. When the tractor engine is rotating at a speed of between 1700 and 1800 R. P. M. the present speed reducer unit will provide a speed of approximately 545 R. P. M. to the farm implement. In one particular embodiment of the present invention the speed reducer unit has been designed to provide a range of between 545 R. P. M. and 557 R. P. M. for the input shaft of the farm implement when the tractor engine is operating between 1750 R. P. M. and 1825 R. P. M., under which condition the tractor is developing its maximum torque. The range of tractor engine operating speeds from between 1750 R. P. M. and 1825 R. P. M. corresponds to practically all conditions of the tractor mechanism when it is operated in low gear in which the transmission is driven at approximately 250 R. P. M. and which is the speed ratio used most by farmers when operating farm implements such as corn pickers, hay balers, etc.

It will be noted from the foregoing variations given for engine R. P. M. and speed reducer unit R. P. M. that the variation in the engine speed is greater than the variation in the output speed of the reducer unit. It therefore is possible to vary the speed of the tractor engine sufficiently to compensate for more difficult operating conditions without varying the speed at which the farm implement is driven to such an extent that it would be detrimental to operate the implement. Accordingly, another object of the present invention is to provide a power take-off speed reduction unit for a tractor which connects a drive shaft driven by the tractor engine with a driven shaft for driving a farm implement which reduction unit provides a relatively small variation in the speed of the driven shaft irrespective of a relatively larger variation in the speed of a drive shaft due to different conditions under which the tractor may be required to operate.

Another object of the present invention is to provide a power take-off speed reduction unit for a tractor which is easily assembled with respect to the power take-off shaft of the tractor. In the attainment of this object of the invention, a speed reducing gear unit comprising a sun gear rotatable with the power take-off shaft and a ring gear rotatable with the input shaft of the farm implement is housed within a casing which is secured to the power take-off shaft casing by means which positively insure the correct alignment of the ring gear with respect to the sun gear. In this connection a casing which rotatably mounts the power take-off shaft is bored with a plurality of holes substantially concentric with reference to the power take-off shaft. The aforementioned casing for housing the sun and ring gears is likewise similarly bored and when bolts are inserted through the holes in each of the casings the ring gear is properly aligned with respect to the sun gear to insure meshing engagement therewith and the implement input shaft on which the ring gear is mounted is properly positioned to drive the implement. In constructing the speed reducer unit and providing this method of assembling with the casing of the power take-off shaft, numerous difficulties have been remedied. In the past many types of makeshift connections have been used in order to insure the proper alignment between the implement input shaft and the tractor power take-off shaft, none of which have proven satisfactory. Another object of the present invention is therefore to provide a speed reduction gear unit which may be attached to the power take-off shaft of a standard farm tractor which will provide the proper R. P. M. for driving a farm implement and which is cheap and easy to manufacture besides being practically foolproof to assemble.

Numerous other objects and advantages of the present invention will become apparent from the following detailed description when read in conjunction with the appended drawing wherein:

Fig. 1 is an end view of the speed reducing unit; and

Fig. 2 is a sectional view of the speed reducing unit taken substantially along the line 2—2 in Fig. 1.

With reference now to the drawing, wherein like reference numerals identify like parts in the different views, a casing 10 is shown adjacent a portion of a casing 11, shown schematically, which houses a portion of the tractor transmission (not shown). A speed reducing unit is designated generally by reference numeral 12 and is housed within a casing 13. The casing 10 rotatably supports a power take-off shaft 14 by means of ball bearing unit 15. The power take-off shaft 14 is splined as at 16 in order to receive mating internal splines in a hub 17 of a sun gear 18.

The casing 13 rotatably supports a driven shaft 19 which may be either a shaft connected to the input shaft of a farm implement such as a corn picker or the shaft 19 may itself constitute the input shaft of the farm implement. The means whereby the shaft 19 is rotatably supported within the casing 13 constitutes a ball bearing unit 20 and a series of roller bearings 21. The shaft 19 has a ring gear 22 formed integrally therewith which has internal teeth 23 which mesh with mating external teeth 24 carried by the sun gear 18.

A collar 25 is secured to the casing 13 by means of bolts 26 and is provided with an oil seal 27 which surround the shaft 19. An oil seal 28 is also provided in the casing 10 and surrounds the hub 17 of the sun gear 18. Each of the casings 10 and 13 are provided with a plurality of spaced apertures 29 for receiving bolts 30 which have threaded portions 31 that are received in suitable internally threaded apertures in the casing 11 in order to rigidly mount the casings 10 and 13 with respect to the casing 11. A plurality of relatively shorter bolts 32 are also provided for connecting the casings 10 and 13. An annular shoulder 33 formed on a locating surface 34 on the casing 10 mates with an annular flange 35 formed on a locating surface 36 on the casing 13. When the bolts 30 and 32 are assembled in the casings 10, 13 and 11 the casing 13 is effectively sealed by the mating shoulder 33 and flange 35.

The shaft 19 is eccentric with respect to the shaft 16. The sun gear 18 has fewer teeth 24 than the ring gear 22 and accordingly with each revolution of the sun gear 18 the ring gear will be driven only a fraction of a revolution in order to step down the speed of rotation of the power take-off shaft 14. When the speed reducer unit 12 is assembled as shown in Fig. 2, the driven shaft 19 assumes the proper position in order to correctly align the two shafts 14 and 19 and the two gears 18 and 22, and also the shaft 19 assumes the proper position for driving the farm implement being towed by the tractor with which the speed reducing unit is associated.

When the speed reducing unit 12 is assembled with the casing 11 the teeth 23 and 24 on the ring and sun gears 22 and 18 respectively, are first partially meshed. Thereafter the casing 13 is moved towards the casing 10 until the locating surfaces 34 and 36 are engaged with the shoulder 33 seated within the flange 35. In order to complete the assembling operation it is then only necessary that the casing 13 be rotated with the flange 35 seated on the shoulder 33 until the apertures in the casings 10 and 13 are aligned properly to permit the bolts 30 to pass therethrough into the casing 11, whereupon they may be tightened. Due to the fact that the long bolts 30 are alternately spaced with the relatively shorter bolts 32 therebetween it is a simple matter to determine when the correct apertures in the casings 10 and 13 are aligned. As has been stated heretofore, when the flange 35 is seated on the shoulder 33, the casing 13 is sealed from dirt and retains lubricating oil placed therein.

As is apparent from the foregoing description the present invention provides a very simple speed reducing unit which may be used in connection with standard tractors. The present speed reducing unit reduces the speed at which a farm implement is driven and enables it to be driven within the proper range of speeds irrespective of a relatively larger range of speeds necessary to enable the tractor to operate under varying conditions. Further the present invention provides a simple speed reducing unit for a tractor which may be assembled on the tractor transmission casing with a minimum of effort and time, and when it is assembled therewith, lubricating fluid is retained therein and dirt is kept away from the speed reducing gears.

It is contemplated that numerous changes may be made in the invention without departing from the spirit or scope thereof.

We claim:

1. In a speed reducing unit for the power take-off shaft of a tractor, the combination of a casing for rotatably mounting a power take-off shaft driven by the tractor transmission, a second casing housing the tractor transmission, a pinion gear splined to said power take-off shaft and rotatable therewith, a third casing rotatably mounting a shaft connected to drive an implement, a ring gear carried by said last mentioned shaft and meshing with said pinion gear for providing a reduced speed power train between said shafts, an annular shoulder formed on said first casing, an annular flange formed on said third casing and mating with said shoulder when said ring and pinion gears mesh one another, said annular flange and annular shoulder sealingly connecting said first and third casings and insuring meshing engagement between said pinion and ring gears, each of said casings having aligned apertures therein, and a plurality of bolts extending through the apertures in said first and third casing and extending into the apertures in said second casing for rigidly connecting said casings together and insuring the correct alignment between the ring gear and second named shaft with respect to the pinion gear and power take-off shaft.

2. In a speed reducing unit for the power take-off shaft of a tractor, the combination of a casing for rotatably mounting a power take-off shaft driven by the tractor transmission, a second casing housing the tractor transmission, a third casing rotatably mounting a shaft connected to drive an implement, speed reduction gearing interconnecting said shafts and including two gears one of which is mounted to rotate with one of said shafts and the other of which is mounted to rotate with the other of said shafts, an annular shoulder formed on one of said first and third casings, an annular flange formed on the other of said first and third casings and matingly engaging said shoulder for sealingly connecting said first and third casings and insuring a driving connection between the elements of said speed reduction gearing, each of said casings having aligned apertures therein, and a plurality of bolts extending through the apertures in said first and third casings and being threaded into the apertures in said second casing for rigidly connecting said casings together, whereby said first and third casings are sealingly engaged and the correct alignment between said shafts is insured.

ROLLIN BERNARD THARPE.
HERBERT A. McANINCH.

REFERENCES CITED

The following references are of record in the file of this patent:

UNITED STATES PATENTS

| Number | Name | Date |
| --- | --- | --- |
| 1,604,401 | Fisher | Oct. 26, 1926 |
| 2,040,287 | Ware | May 12, 1936 |
| 2,132,813 | Walilmark | Oct. 11, 1938 |
| 2,214,164 | Fawick | Sept. 10, 1940 |
| 2,540,973 | Wallace | Feb. 6, 1951 |